(12) United States Patent
Hodgson et al.

(10) Patent No.: US 9,470,097 B2
(45) Date of Patent: Oct. 18, 2016

(54) AIRFOIL WITH LEADING EDGE REINFORCEMENT

(71) Applicant: Rolls-Royce Corporation, Indianapolis, IN (US)

(72) Inventors: Benedict N. Hodgson, Indianapolis, IN (US); Jonathan M. Rivers, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 567 days.

(21) Appl. No.: 14/094,313

(22) Filed: Dec. 2, 2013

(65) Prior Publication Data

US 2015/0044056 A1 Feb. 12, 2015

Related U.S. Application Data

(60) Provisional application No. 61/781,545, filed on Mar. 14, 2013.

(51) Int. Cl.

| F01D 5/28 | (2006.01) |
|---|---|
| B23K 1/00 | (2006.01) |
| B23K 31/02 | (2006.01) |
| F01D 5/14 | (2006.01) |
| F01D 21/04 | (2006.01) |
| F04D 29/32 | (2006.01) |
| F04D 29/54 | (2006.01) |

(52) U.S. Cl.
CPC .............. *F01D 5/282* (2013.01); *B23K 1/0008* (2013.01); *B23K 31/02* (2013.01); *F01D 5/14* (2013.01); *F01D 5/146* (2013.01); *F01D 5/286* (2013.01); *F01D 5/288* (2013.01); *F01D 21/045* (2013.01); *F04D 29/324* (2013.01); *F04D 29/542* (2013.01); *F05D 2230/237* (2013.01); *F05D 2240/303* (2013.01); *Y02T 50/672* (2013.01); *Y02T 50/673* (2013.01)

(58) Field of Classification Search
CPC .......... F01D 5/14; F01D 5/146; F01D 5/282; F01D 5/288; F01D 5/286; B23K 1/0008; B23K 31/02; F04D 29/324; F04D 29/542; F05D 2230/237; F05D 2240/303; Y03T 50/673; Y03T 50/672
See application file for complete search history.

(56) References Cited

U.S. PATENT DOCUMENTS

| 3,002,567 | A | * | 10/1961 | Stulen | B64C 27/473 228/178 |
|---|---|---|---|---|---|
| 4,010,530 | A | * | 3/1977 | Delgrosso | B23K 20/00 228/160 |
| 4,121,894 | A | * | 10/1978 | Cretella | B23K 10/027 416/213 R |
| 4,795,313 | A | * | 1/1989 | Coulon | C22C 33/0292 228/262.72 |
| 4,802,828 | A | | 2/1989 | Rutz et al. | |
| 5,193,736 | A | | 3/1993 | Marijnissen et al. | |
| 5,348,446 | A | | 9/1994 | Lee et al. | |
| 5,392,514 | A | | 2/1995 | Cook et al. | |
| 5,725,354 | A | | 3/1998 | Wadia et al. | |

(Continued)

OTHER PUBLICATIONS

International Search Report for PCT International Application Serial No. PCT/US2013/072577, completed Jul. 14, 2014, (11 pages).

*Primary Examiner* — Igor Kershteyn
(74) *Attorney, Agent, or Firm* — Barnes & Thornburg LLP

(57) ABSTRACT

A leading edge member for a composite vane of a gas turbine engine. The leading edge member includes a first leg and a second leg. The first leg includes a proximal end joined to a proximal end of the second leg.

20 Claims, 3 Drawing Sheets

(56) References Cited

U.S. PATENT DOCUMENTS

| | | |
|---|---|---|
| 6,524,074 B2 | 2/2003 | Farrar et al. |
| 7,146,725 B2 | 12/2006 | Kottilingam et al. |
| 7,156,622 B2 | 1/2007 | Schreiber |
| 7,753,654 B2 | 7/2010 | Read et al. |
| 7,966,707 B2 | 6/2011 | Szela et al. |
| 8,449,784 B2 * | 5/2013 | Parkos .................... F01D 5/005 216/100 |
| 8,752,289 B2 * | 6/2014 | Jones .................. B21D 26/055 228/190 |
| 8,764,959 B2 * | 7/2014 | Smith ..................... C23C 30/00 205/73 |
| 8,814,527 B2 * | 8/2014 | Huth ..................... B64C 11/205 416/224 |
| 2005/0217110 A1 | 10/2005 | Topal |
| 2006/0275626 A1 | 12/2006 | Bernard et al. |
| 2009/0208342 A1 | 8/2009 | Mons |
| 2010/0054945 A1 | 3/2010 | McMillan et al. |
| 2011/0211967 A1 | 9/2011 | Deal et al. |
| 2011/0274555 A1 | 11/2011 | Iwasaki |
| 2012/0114494 A1 | 5/2012 | Ford et al. |
| 2012/0301292 A1 | 11/2012 | Deal et al. |
| 2013/0101423 A1 * | 4/2013 | Roy ....................... F01D 5/147 416/223 R |

\* cited by examiner

AIRFOIL WITH LEADING EDGE REINFORCEMENT

CROSS REFERENCE TO RELATED APPLICATIONS

This application claims priority to and the benefit of U.S. Provisional Patent Application No. 61/781,545, filed 14 Mar. 2013, the disclosure of which is now incorporated herein by reference.

FIELD OF THE DISCLOSURE

The present disclosure relates generally to gas turbine engines. More specifically, this disclosure relates to composite vanes used in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, a fan, propeller, or output shaft. Left-over products of the combustion are exhausted out of the turbine and may provide thrust in some applications.

Fans, compressors, and turbines typically include alternating stages of static vane assemblies and rotating wheel assemblies. Static vane assemblies are sometimes made from composite materials such as carbon fiber composites or the like. Some such composite materials have poor impact resistance properties and may become damaged during operation of a gas turbine engine due to foreign objects ingested by the engine (sand, small rocks, birds, etc.). To reduce the effects of impact damage, some composite vane assemblies include thin metallic strips mounted on the leading edge. However, such metallic strips can also be damaged and may need to be replaced often.

SUMMARY

The present application discloses one or more of the features recited in the appended claims and/or the following features which, alone or in any combination, may comprise patentable subject matter.

An airfoil for a gas turbine engine includes a core body and a leading edge member joined to the core body. The leading edge member is joined to the core body along a leading edge of the core body to block foreign objects (such as sand, small rocks, birds, etc.) ingested by the engine from directly impacting the leading edge of the core body. By blocking foreign objects ingested by the engine from directly impacting the leading edge of the core body, the leading edge member reduces impact damage sustained by the core body of the airfoil during operation of the engine.

In illustrative embodiments, the leading edge member is made from sheet metal having a constant thickness. The leading edge member is formed to have a generally V-shaped cross-section and defines an opening that receives the leading edge of the core body. When the leading edge member is joined to the core body, an internal cavity is defined between the leading edge member and the leading edge of the core body.

In illustrative embodiments, the airfoil also includes a reinforcement member positioned in the internal cavity between the leading edge member and the leading edge of the core body. The reinforcement member is illustratively made from a metallic alloy and is joined to the leading edge member along a tip of the V-shaped cross-section. The reinforcement member is illustratively joined to the leading edge member by melting the metallic alloy so that the metallic alloy conforms to the tip of the V-shaped cross-section and reinforces the leading edge member. By reinforcing the leading edge member, the reinforcement member increases the strength and resistance to impact of the leading edge member.

These and other features of the present disclosure will become more apparent from the following description of the illustrative embodiments.

DETAILED DESCRIPTION OF THE DRAWINGS

Figure 1:
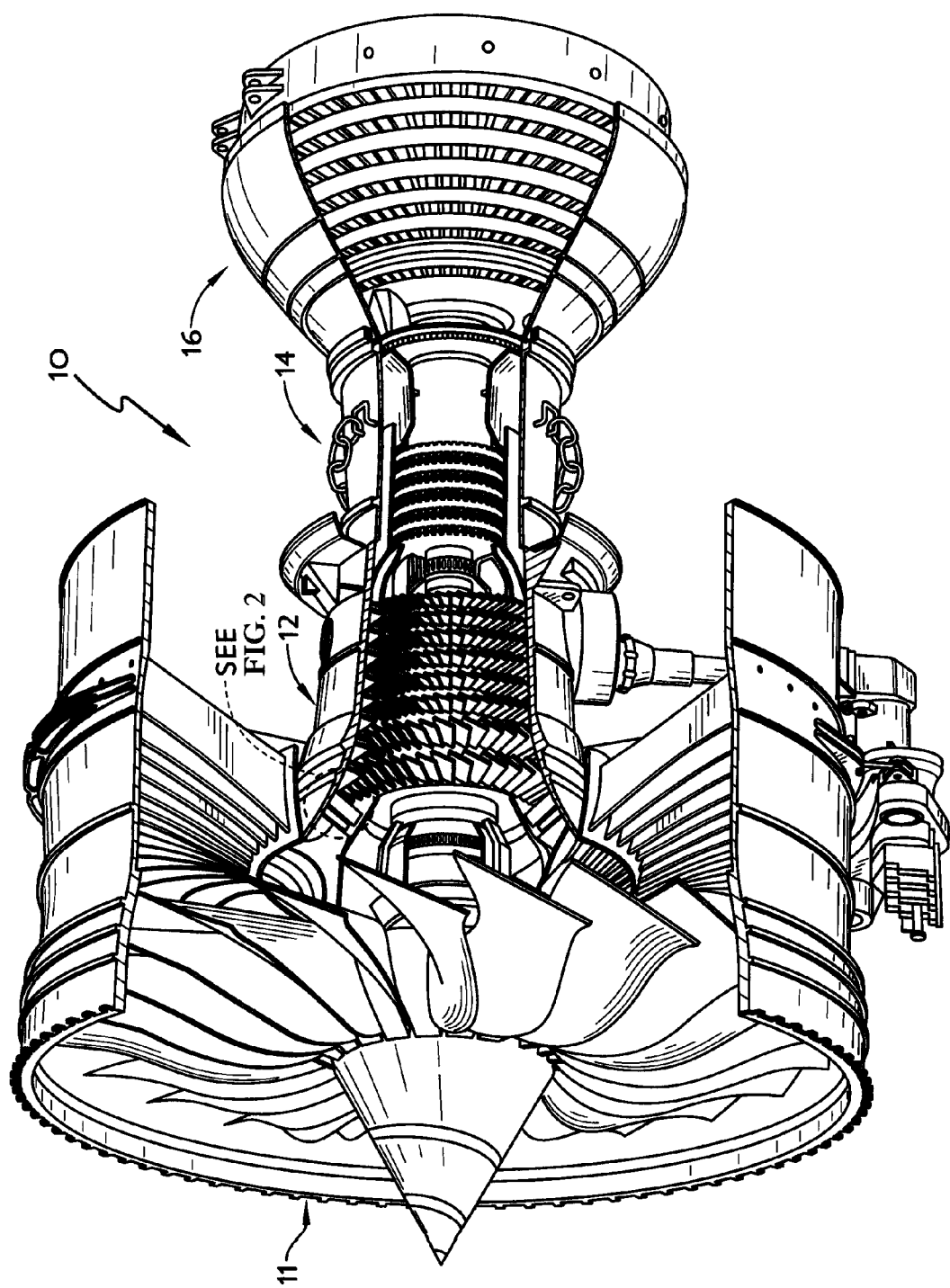
FIG. 1 is a cut-away perspective view of a gas turbine engine.

For the purposes of promoting an understanding of the principles of the disclosure, reference will now be made to a number of illustrative embodiments illustrated in the drawings and specific language will be used to describe the same.

FIG. 1 is an illustrative gas turbine engine 10 cut-away to show that the engine 10 includes a fan 11, a compressor 12, a combustor 14, and a turbine 16. The compressor 12 is configured to compress and deliver air to the combustor 14. The combustor 14 is configured to mix fuel with the compressed air received from the compressor 12 and to ignite the fuel. The hot high pressure products of the combustion reaction in the combustor 14 are directed into the turbine 16 and the turbine 16 extracts work to drive, among other things, the fan 11 and the compressor 12.

Figure 2:
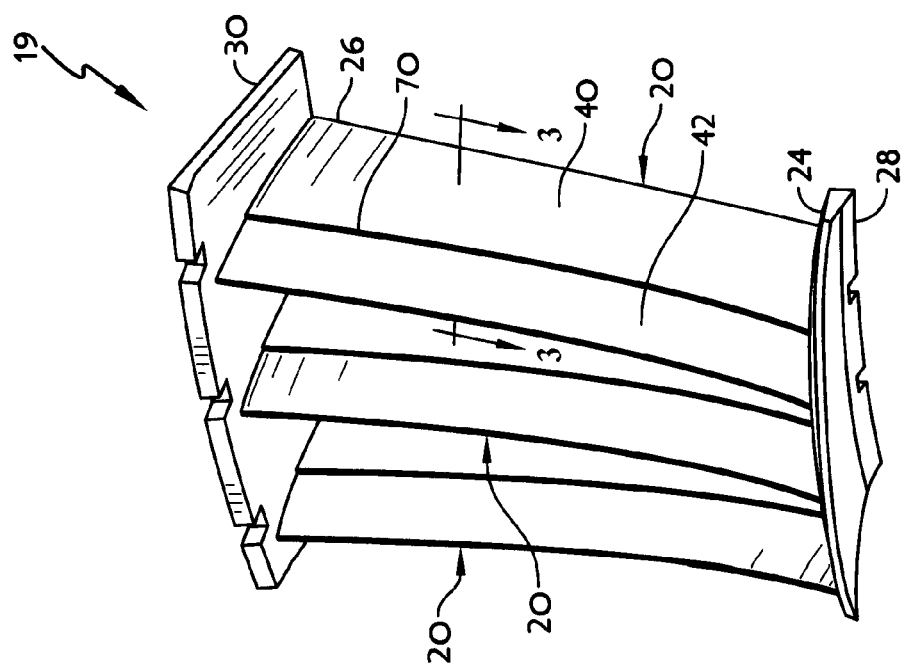
FIG. 2 is a detail view of FIG. 1 showing a portion of a vane assembly of the gas turbine engine.

Fan 11, compressor 12, and turbine 16 may include one or more vane assemblies 18. A vane segment 19 included in the vane assembly 18 is shown in FIG. 2. Each segment 19 of vane assembly 18 includes a plurality of spaced apart composite vanes (or airfoils) 20. Each composite vane 20 extends between a first end 24 and a second end 26. First end 24 of each composite vane 20 is coupled to a first ring 28 and second end 26 of each composite vane 20 is coupled to a second ring 30 that is spaced apart from first ring 28.

Figure 3:
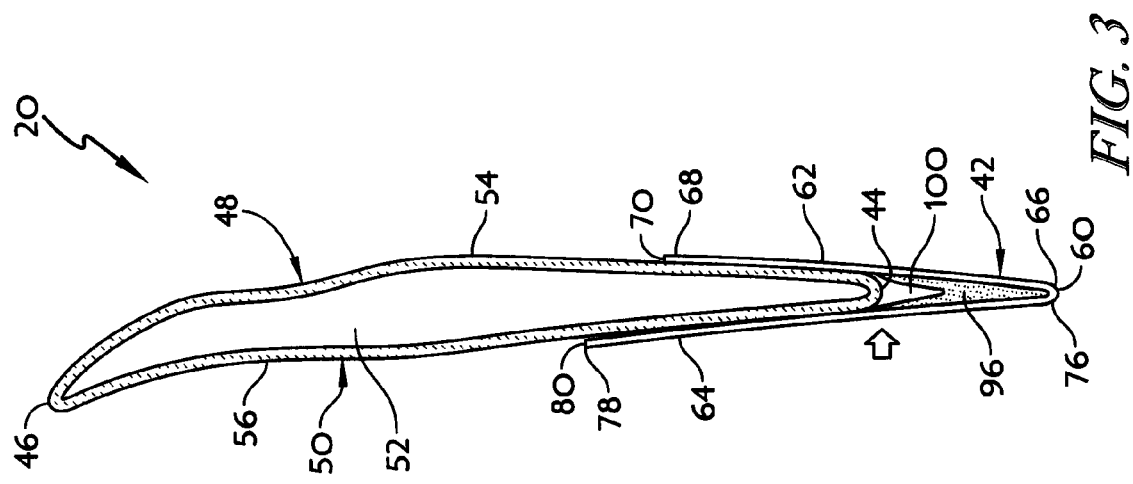
FIG. 3 is a cross-sectional view of a composite vane of a vane assembly taken along line 3-3 of FIG. 2.

Each composite vane 20 includes a core body 40 and a leading edge member 42 joined to core body 40 via an adhesive (or in other embodiments via rivets or other fasteners) as shown in FIGS. 2 and 3. Core body 40 forms a leading edge 44 and a trailing edge 46. Core body 40 includes a first side wall 48 that extends between leading edge 44 and trailing edge 46, and a second side wall 50 that extends between leading edge 44 and trailing edge 46. First side wall 48 and second side wall 50 may be spaced apart from one another to form a cavity 52 therebetween. In some embodiments, cavity 52 may be filled with a fill material (such as expandable foam) or core body 40 may be solid. First side wall 48 includes an outer surface 54 that extends from leading edge 44 to trailing edge 46. Second side wall 50 includes an outer surface 56 that extends from leading edge 44 to trailing edge 46. First side wall 48 and second side wall 50 may be formed from carbon fiber reinforced plastic composite materials.

Leading edge member 42 is generally V-shaped in cross-section and includes a tip 60 as shown in FIG. 3. Leading edge member 42 includes a first leg 62 and a second leg 64. First leg 62 includes a proximal end 66 located at tip 60 and a distal end 68 having a distal edge 70. First leg 62 includes an internal surface 72 that extends between proximal end 66 and distal end 68 and an external surface 74 that extends between proximal end 66 and distal end 68.

Figure 4:
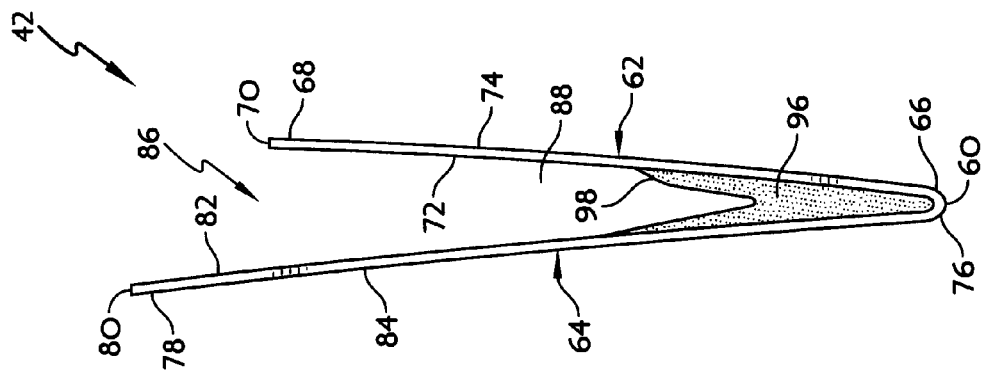
FIG. 4 is a cross-sectional view of a leading edge member of the composite vane of FIG. 3.
Figure 5:
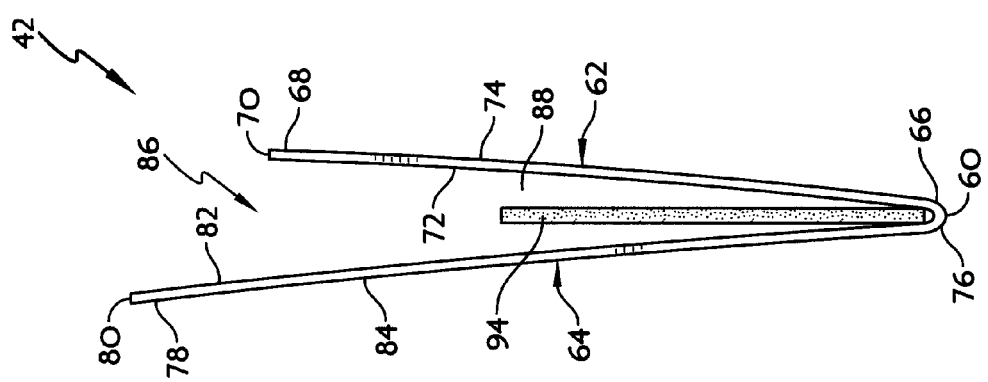
FIG. 5 is a cross-sectional view of the leading edge member of the composite vane showing a braze alloy material being applied to an interior cavity of the leading edge member.

Second leg 64 of leading edge member 42 includes a proximal end 76 located at tip 60 and a distal end 78 having a distal edge 80. Second leg 64 includes an internal surface 82 extending from proximal end 76 to distal end 78, and an external surface 84 extending from proximal end 76 to distal end 78. Proximal end 76 of second leg 64 is joined to proximal edge 66 of first leg 62 at tip 60. Distal end 68 of first leg 62 is spaced apart from distal end 78 of second leg 64. An opening 86 is formed between distal end 68 of first leg 62 and distal end 78 of second leg 64 that is adapted to receive leading edge 44 of core body 40. First leg 62 and second leg 64 of leading edge member 42 form an internal cavity 88 between internal surfaces 72 and 82 of first leg 62 and second leg 64 and that extends from tip 60 to opening 86, as shown in FIG. 4.

First leg 62 and second leg 64 of leading edge member 42 may be formed from standard sheet metal that may be formed by a mandrel, extrusion, deposition, or plating operation. First leg 62 and second leg 64 of leading edge member 42 may be formed from sheet stainless steel, electroformed nickel alloy or stainless steel wire mesh. The sheet metal may be bent and formed into the generally V-shape of first leg 62 and second leg 64 of the leading edge member 42. Tip 60 of leading edge member 42 may need a relatively small radius, thereby necessitating that the thickness of the sheet metal material be thin due to sheet metal bending limits. Thin sheets of metal used to form leading edge members can crack and tear due to impact.

First leg 62 and second leg 64 of leading edge member 42 both have a relatively thin thickness between internal surface 72 and external surface 74 and between internal surface 82 and external surface 84. First leg 62 of leading edge member 42 has a generally constant thickness from proximal end 66 to distal end 68. Second leg 64 of leading edge member 42 has a generally constant thickness from proximal end 76 to distal end 78. First leg 62 and second leg 64 have the same general thickness.

Figure 6:
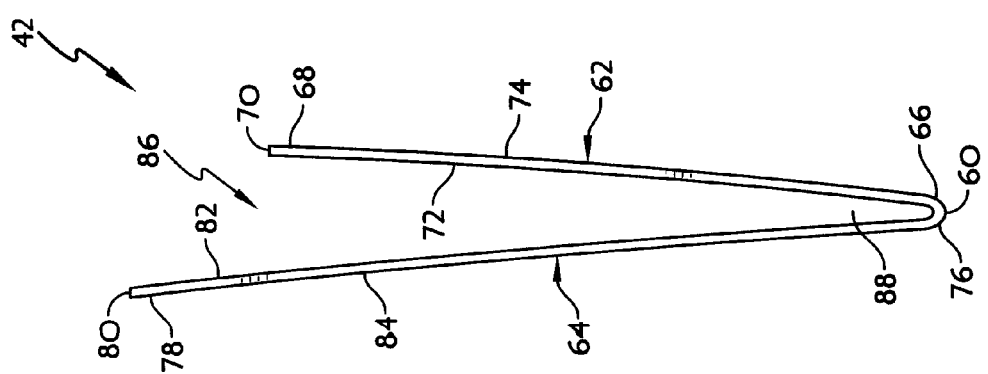
FIG. 6 is a cross-sectional view of the leading edge member of the composite vane shown with a reinforcement member formed in the tip of the interior chamber of the leading edge member, at the tip of the leading edge member, by the braze alloy material.

A braze alloy material 94 is applied, through opening 86, in a heated brazing operation to internal surfaces 72 and 82 of first leg 62 and second leg 64 within cavity 88 at proximal end 66 of first leg 62 and proximal end 76 of second leg 64, adjacent tip 60. Braze alloy material 94 forms a reinforcement member 96, as shown in FIG. 6, that extends between and that is joined to first leg 62 and second leg 64 at tip 60 and within cavity 88. Reinforcement member 96 includes a generally V-shaped meniscus 98 extending between first leg 62 and second leg 64. Reinforcement member 96, as formed by the braze alloy material 94, solidly fills the portion of cavity 88 between proximal end 66 of first leg 62 and proximal end 76 of second leg 66 from tip 60 to meniscus 98. In some embodiments, a solder alloy material may be used in place of braze alloy material 94 to form reinforcement member 96. In some embodiments, the braze alloy material 94 (or a solder alloy material) may be heated by torch heating, induction heating operation, or furnace heating to form the reinforcement member 96.

Leading edge 44 of core body 40 is inserted into cavity 88 of leading edge member 42 through opening 86. First leg 62 of leading edge member 42 is joined to outer surface 54 of first side wall 48 of core body 40 and second leg 64 of leading edge member 42 is joined to outer surface 56 of second side wall 50 of core body 40. Meniscus 98 of reinforcement member 96 is located closely adjacent to, or in contact with, leading edge 44 of core body 40. A small chamber 100 may be located between meniscus 98 of reinforcement member 96 and leading edge 44 of core body 40 as shown in FIG. 3.

Leading edge member 44 including reinforcement member 96 at tip 60, has an overall solid thickness at tip 60 of leading edge member 42 between first leg 62 and second leg 64 that extends from tip 60 to meniscus 98 of reinforcement member 96. The overall solid thickness of leading edge member 42 increases in thickness as first leg 62 and second leg 64 extend from tip 60 to meniscus 98 of reinforcement member 96.

Reinforcement member 96 increases the strength and resistance to impact of leading edge member 42, without requiring any increase in the thickness of the first leg 62 or second leg 64 of leading edge member 42 and without any increase in the external dimensions of the leading edge member 42. Leading edge member 42 including reinforcement member 96 is thereby less prone to damage during engine operation and requires less repair and provides a longer operational life than a leading edge member without reinforcement member 96.

In other embodiments, the airfoils including core bodies 40 and leading edge members 42 as described herein may be used in rotating applications within a gas turbine engine. For example, fan blade airfoils, compressor blade airfoils, and/or turbine blade airfoils may include core bodies reinforced with leading edge members as described herein.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:
1. An airfoil for a gas turbine engine comprising
a core body having a leading edge, a trailing edge, a first surface extending between the leading edge and the trailing edge, and a second surface extending between the leading edge and the trailing edge;
a leading edge member having a tip, a first leg extending from a first proximal end at the tip to a first distal end, a second leg extending from a second proximal end at the tip to a second distal end, the first distal end of the first leg being joined to the first surface of the core body, the second distal end of the second leg being joined to the second surface of the core body, and an interior cavity located between the first leg and the second leg at the tip of the leading edge member; and a reinforcement member located within the interior cavity of the leading edge member, the reinforcement member being joined to the proximal end of the first leg of the leading edge member and joined to the proximal end of the second leg of the leading edge member.

2. The airfoil of claim 1, wherein said leading edge member is formed from sheet metal.

3. The airfoil of claim 1, wherein the reinforcement member comprises a braze alloy material.

4. The airfoil of claim 1, wherein the reinforcement member includes a meniscus extending between the first leg and the second leg of the leading edge member.

5. The airfoil of claim 4, wherein the meniscus of the reinforcement member forms a generally V-shaped notch.

6. The airfoil of claim 1, wherein the first leg of the leading edge member has a generally constant thickness, and the second leg of the leading edge member has a generally constant thickness that is generally equal to the thickness of the first leg member.

7. The airfoil of claim 1, wherein the reinforcement member fills a portion of the interior cavity of the leading edge member at the tip of the leading edge member and between the first proximal end of the first leg and the second proximal end of the second leg.

8. A leading edge member for an airfoil included in a gas turbine engine, the leading edge member comprising a first leg extending from a first proximal end to a first distal end;

a second leg extending from a second proximal end to a second distal end, the first distal end of the first leg being joined to the first distal end of the second leg, the first leg and the second leg forming an interior cavity between the first leg and the second leg; and a reinforcement member located within the interior cavity and extending between the first leg and the second leg, the reinforcement member being joined to the proximal end of the first leg and to the proximal end of the second leg.

9. The leading edge member of claim 8, wherein the reinforcement member comprises a braze alloy material.

10. The leading edge member claim 8, including a tip formed by the proximal end of the first leg and the proximal end of the second leg, wherein the reinforcement member fills a portion of the interior cavity at the tip between the first proximal end of the first leg and the second proximal end of the second leg.

11. The leading edge member of claim 8, wherein the reinforcement member includes a meniscus extending between the first leg and the second leg.

12. A method of manufacturing an airfoil comprising the steps of forming a strip of metal into a V-shape having a first and a second leg, applying a braze alloy to an internal cavity defined by the strip of metal, and melting the braze alloy so that a meniscus of braze alloy is formed at the intersection of first and the second leg of the V-shaped strip of metal.

13. The method of claim 12, wherein the forming step is performed by one of a mandrel, an extrusion process, a deposition process, and a plating process.

14. The method of claim 12, further comprising the step of coupling the strip of metal to an airfoil.

15. The method of claim 14, wherein the airfoil includes a composite material.

16. The method of claim 14, wherein the strip of metal is arranged to extend over a leading edge of the airfoil.

17. The method of claim 14, wherein the braze alloy is arranged to extend along a leading edge of the airfoil.

18. The method of claim 12, wherein the braze alloy includes silver.

19. The method of claim 12, wherein the strip of metal is sheet metal.

20. The method of claim 12, wherein the strip of metal includes at least one of stainless steel, electroformed nickel alloy, and stainless steel mesh.

\* \* \* \* \*